(12) United States Patent
Lee et al.

(10) Patent No.: US 8,863,077 B2
(45) Date of Patent: *Oct. 14, 2014

(54) BUILD SYSTEM REDIRECT

(71) Applicant: Apple Inc., Cupertino, CA (US)

(72) Inventors: Genevieve Lee, San Jose, CA (US);
Anders Bertelrud, Burlingame, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/916,337

(22) Filed: Jun. 12, 2013

(65) Prior Publication Data
US 2013/0283235 A1  Oct. 24, 2013

Related U.S. Application Data

(63) Continuation of application No. 12/398,077, filed on Mar. 4, 2009, now Pat. No. 8,468,498.

(60) Provisional application No. 61/033,739, filed on Mar. 4, 2008.

(51) Int. Cl.
*G06F 9/44* (2006.01)
*G06F 15/16* (2006.01)

(52) U.S. Cl.
CPC ........................................ *G06F 8/71* (2013.01)
USPC ............ 717/106; 717/126; 717/136; 709/218

(58) Field of Classification Search
None
See application file for complete search history.

(56) References Cited

U.S. PATENT DOCUMENTS

| | | | |
|---|---|---|---|
| 5,819,093 A * | 10/1998 | Davidson et al. | 717/126 |
| 5,872,977 A | 2/1999 | Thompson | |
| 6,493,868 B1 | 12/2002 | DaSilva et al. | |
| 7,003,759 B2 | 2/2006 | Jameson | |
| 7,027,997 B1 * | 4/2006 | Robinson et al. | 705/7.26 |
| 7,100,195 B1 * | 8/2006 | Underwood | 726/2 |
| 7,263,695 B1 | 8/2007 | Muzaffar et al. | |
| 7,966,611 B2 | 6/2011 | Berman | |
| 7,987,455 B1 * | 7/2011 | Senner et al. | 717/136 |
| 2006/0064681 A1 | 3/2006 | Robinson | |
| 2006/0129972 A1 * | 6/2006 | Tyburski et al. | 717/106 |
| 2007/0011669 A1 | 1/2007 | Varma et al. | |
| 2008/0059946 A1 * | 3/2008 | Harding et al. | 717/106 |

* cited by examiner

*Primary Examiner* — Don Wong
*Assistant Examiner* — Mohammad Kabir
(74) *Attorney, Agent, or Firm* — Blakely, Sokoloff, Taylor & Zafman LLP

(57) ABSTRACT

Embodiments may provide a makefile interposer, which enables a makefile to be used for building software for different platforms without modifying the makefile. In some embodiments, the interposer intercepts the commands run by makefile and automatically interposes the correct library files, dependencies, paths, and other information used by make to build the program for a particular platform. Additionally, calls that the invoked tools themselves make are intercepted and the interposer may redirect them to the platform-specific tools or file system locations including redirecting file descriptors. In some instances, when a tool is called that is not in the platform, the interposer may also fall back on the other system tools.

9 Claims, 15 Drawing Sheets

BUILD SYSTEM REDIRECT

This application is a continuation of co-pending U.S. application Ser. No. 12/398,077 filed on Mar. 4, 2009, which claims priority to U.S. Provisional Application No. 61/033,739, filed Mar. 4, 2008, and entitled BUILD SYSTEM REDIRECT.

BACKGROUND

Embodiments of the invention relate to a software build tool. More specifically, embodiments of the invention relate to techniques and mechanisms to manage building of applications including redirecting calls to selected files.

Computer systems generally run software programs which carry out the desired functionality of users of the computer systems. The programs which run on the computer system are generally executable program files. An executable program file is generally a binary representation of machine instructions specific to the processor the program is intended to run on. An executable program file may also be a binary representation of the machine instructions for a virtual machine. It is very difficult for programmers to understand the binary representation of machine instructions. Even if the binary representation were to be translated to the machine instructions themselves, it would still be hard for programmers to read and understand the machine instructions. With modern computing, computer programs are now written by programmers in high-level, human readable instructions. These high level instructions are often referred to as "source code." Examples of such high-level languages include C, C++, and JAVA.

Unfortunately, source code is often not directly executable by the computer system. The high-level source code is often translated into "object files" by a compiler. The compiler reads the high-level source code and creates object files which contain a machine code version of the source code. A program called a linker creates an executable file by taking the object files and linking them to the appropriate libraries, modules or routines need by the program. The executable file is now capable of being run on the computer system.

As user requirements have become more complex and varied, programs have also become more complex and varied. While a program may be created using only a single source code file, it is often easier to organize the code into separate source code files. These separate source code modules may each contain parts of the complete source code for the program and may often be organized such that they are logical representations of the overall structure of the program. Because of the separation of the complete source code into modules, some modules may use or "depend" on other modules. For example, a first module may require the functions, variables or objects defined in a second module, so in order to compile the first module, one would first have to compile the second module first. Such a relationship between the first module and the second module is called a "dependency." These dependencies often complicate the compilation process as changes in one module may result in many other modules having to be recompiled.

In order to solve problems resulting from dependencies, a "make" utility is used to control the compiler. The make utility keeps track of the dependencies and controls the compiler to recompile not only source code modules that were modified, but also other modules which depend on the changed modules. The make utility is run every time changes are made to any module so that all dependent programs or modules are properly recompiled. A make utility requires that the source code programmer also compose a specialized control file, known as a "makefile", which contains instructions or commands that the make function uses to control the compilation and linking of each of the source code modules when the make function is executed. The makefile typically includes a hierarchy of source modules that embody the dependencies found in the program, for example, a makefile may include a variety of elements such as a series of instructions containing "targets", dependencies, and "shell commands" for updating the targets.

BRIEF DESCRIPTION OF THE DRAWINGS

Exemplary embodiments are explained in greater detail in the following description and are illustrated in the drawings, in which.

DETAILED DESCRIPTION

Many software programs are created using what is known as the make utility or some other equivalent utility. In general, each project for each platform may require its own makefile. For example, each project may have its own compiler, linker, libraries, file paths, options and dependencies specified in a makefile. In addition, there is generally one makefile for each platform the project may run on. This requires a lot of duplication and extra effort to build a project for other platforms. It often becomes difficult to track and maintain such a large number of make files. A small change in one makefile would require changing all of the makefiles for the same project on different platforms. Embodiments of the present disclosure can provide a more streamlined and efficient approach to using makefiles and can allow developers to use a fewer versions of a makefile for building their program. In some embodiments, the same makefile may be used to build programs across all targeted platforms without needing to modify it in any way. The makefile remains compatible with the original project. This can alleviate the need for developers to create and maintain a makefile for every platform they wish to build the program for, or to parameterize their makefiles and have large conditional statements to cover all the different platforms, In build systems where other types of program build or install files are used, similar needs may exist where, for example a shell script in one UNIX environment such as a configuration or installation script may need to be ported to another UNIX environment. Other types of such build, installation and configuration specification files are known in the art.

Embodiments may now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments. Furthermore, embodiments may include several novel features, no single one of which is solely responsible for its desirable attributes or which is essential to practicing the inventions herein described.

Figure 1A:
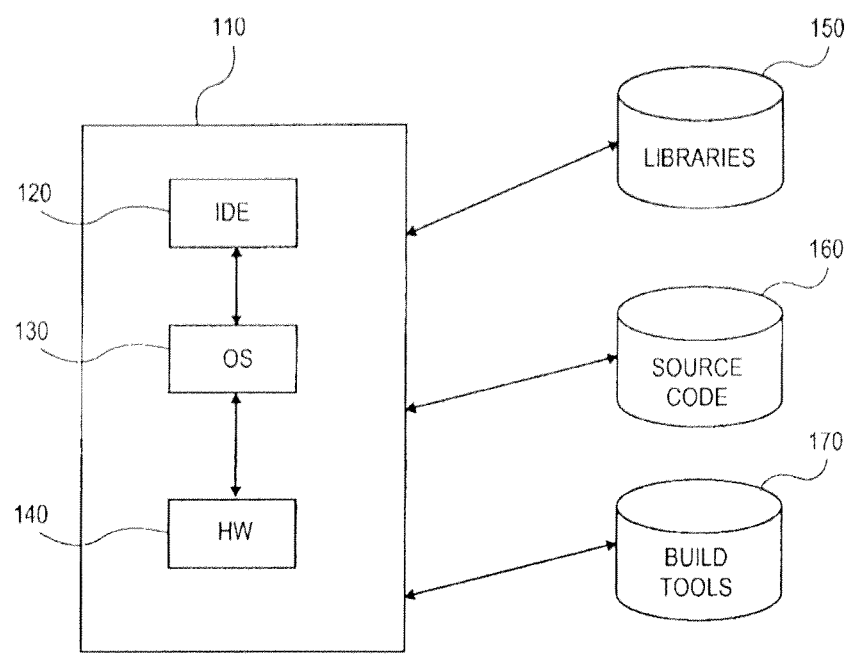
FIG. 1A shows a component diagram of a computer system running an integrated development environment.

FIG. 1A shows a component diagram of a computer system 110 running an integrated development environment 120. The computer system 110 is an example of a computing device running a particular set of hardware 140, software and operating system 130. The integrated development environment (IDE) 120 may run within the operating system 130 and may use operating system 130 to interface with the hardware 140 of the computer system. In on embodiment, the functionality of make utility and the makefile may reside within the IDE 120. In another embodiment, the make utility and the makefile may be separate from IDE 120. The make utility may use libraries 150, source code 160 build tools 170, or any other files and applications it needs to build a program according the commands in the makefile. The libraries 150, source code 160 build tools 170, or any other files and applications may be located in a memory on computer system 110.

Figure 1B:
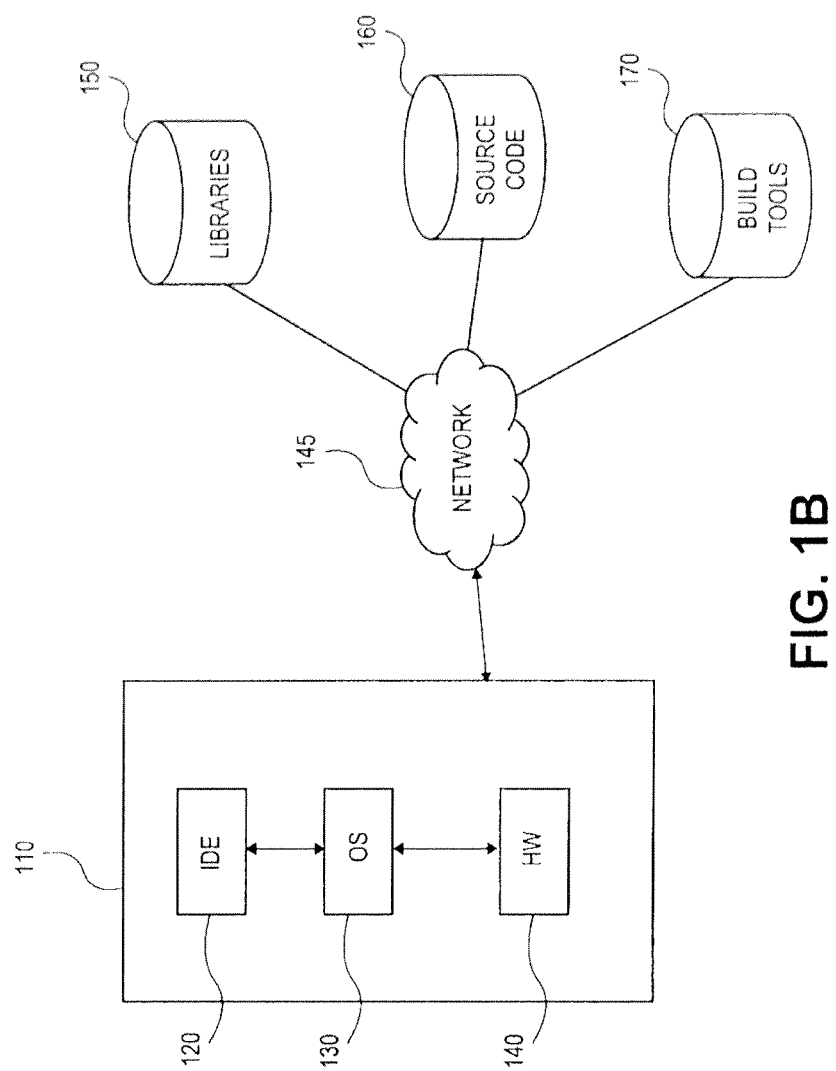
FIG. 1B shows another component diagram of a computer system running an integrated development environment.

FIG. 1A shows another component diagram of a computer system 110 running an integrated development environment 120. The computer system 110 is an example of a computing device running a particular set of hardware 140, software and operating system 130. The IDE 120 may run within the operating system 130 and may use operating system 130 to interface with the hardware 140 of the computer system. In on embodiment, the functionality of make utility and the makefile may reside within the IDE 120. In another embodiment, the make utility and the makefile may be separate from IDE 120. The make utility illustrated in FIG. 1B may use libraries 150, source code 160 build tools 170, or any other files and applications it needs to build a program according the commands in the makefile. The libraries 150, source code 160 build tools 170, or any other files and applications may be located on another computer system and are accessed via a network "cloud" 145 which may represent a local area network (LAN), a wide area network (WAN), the Internet, or another connection service, In other embodiments, a shell program may be invoked or another program such as Perl may be invoked to execute an installation or configuration script.

Figure 2A:
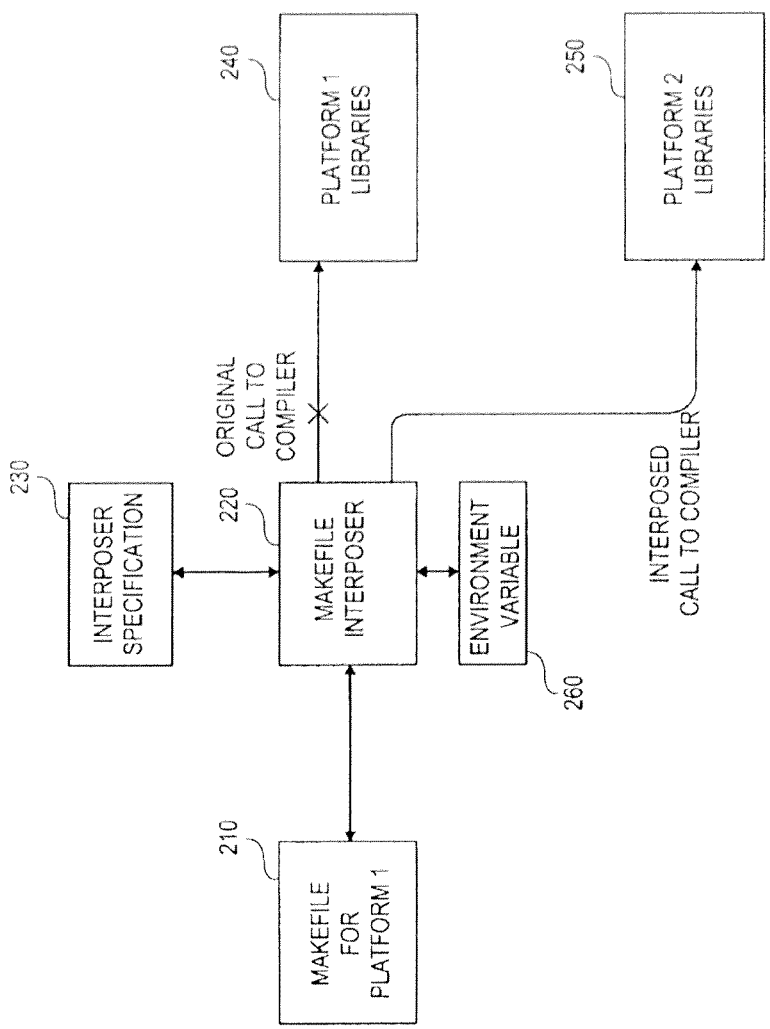
FIG. 2A shows a component diagram of a makefile interposer according to a first embodiment.

FIG. 2A is a component diagram of an embodiment. Makefile 210 may include commands that may be used by the make utility to build a program for a first platform. The makefile interposer 220 may process the makefile 210. Interposing can be used to redirect commands invoked by tools in a specified platform during compilation, and may fall back to other system tools if a platform-specific tool isn't found.

In some embodiments, redirect commands invoked by make to invoke tools in a specified platform. For example, for a platform A, which has its own compiler, assembler, and linker, a developer may pass a path to construct and set an environment variable, which is picked up by makefile interposer 220. Interposer 220 may intercept the system calls that make uses to execute build tools, such as open( ) and execve( ), as well as other system calls. Therefore, with interposer 220, an execve call to cc may call Platform A's cc instead of /usr/bin/cc.

In addition, calls that the invoked tools themselves make are intercepted and interposer 220 may redirect them to the platform-specific tools or file system locations (including redirecting file descriptors). Hence, when cc calls execve( ) or open( ) to invoke a linker, for example, interposer 220 may pick up the linker from Platform A.

In some instances, when a tool is called that is not in the platform, interposer 220 may fall back on the other system tools. This enables platform developers to sparsely provide the tools, for example, that are modified for their platform. Furthermore, system calls like access( ) or mmap( ) that take a path or file descriptor can be intercepted and checked for a platform-relative equivalent location, falling back to the original path or file descriptor if a platform-relative one is not found.

Accordingly, without any changes to the makefile, and without the makefile or the developer knowing anything about interposing or which tools are defined in the platform, a makefile project can now be built for any platform with which its source is compatible. In other words, a developer may not need to alter the makefiles or make a new set of platform-specific makefiles. Instead, a different flag on the command line can be passed that is recognized by makefile interposer 220.

This is merely one example of the usage of interposing to support platform development for makefile projects. Other examples and implementations of this interposing mechanism are also part of embodiments of the present invention.

The above-described interposition mechanism may for example be used to interpose system library calls made by Perl, Python or other interpreted language, or a shell interpreter while executing an installation or configuration script in a shell language or in an interpreted language such as Perl or Python. Such interposition may then redirect calls made by the shell or script interpreter to customize the execution of the shell script or interpreted program for a particular platform and/or environment. In one embodiment, the makefile interpose may be used to allow shell scripts, Perl scripts or other utilities to be used on multiple platforms. For example, a particular set of libraries may need to be built on a platform before it can be used. Generally, when the library source files are obtained, there is an installer script that will build and install the library files. The makefile interpose may allows the installer script to run on another platform by interposing all calls made by the installer script so that the script can run on another platform.

Referring now back to FIG. 2A, makefile interposer 220 may check an environment variable 260 to determine which platform the program may be built for. In this example, the environment variable 260 may specify that the program is to be built for a second platform. The environment variable 260 may include a name or any information which may be used to identify a platform. The original compiler for platform one is specified in makefile 210. The makefile interposer 220 may intercept the command which calls the compiler, and it may interpose (i.e. change or substitute) the call to the compiler for the first platform 240 with a call to the compiler for the second platform 250. In one embodiment, the make file interposer 220 may run the command specified in the makefile 210. Make may call the compiler for the first platform and the makefile interposer 220 may intercept the call to the compiler for the first platform 240, and redirect that call to the compiler for the second platform 250. This interception and redirection is done when the compiler for the first platform is called. The makefile interposer 220 may intercept any access to system resources and redirect them to the appropriate location. In one embodiment, the makefile interposer may redirect file access made by any tool. For example, when running a makefile created for platform 1 to build an application for platform 2, any attempts to access/usr/lib/libOpenGL.dylib, which is used by platform 1, are redirected to /MacOSX/Libraries/libOpenGL.dylib which is used by platform 2. In another embodiment, the makefile interposer 220 may analyze the command and then interpose the compiler for the second platform 250 before calling the compiler.

In one embodiment, the makefile interposer may interpose calls made by other build systems. Make is a common build system that is often used by software developers. There are a variety of other build systems used by software developers including but not limited to Ant, GNU Autoconf and SCons. All calls made by such build systems may be interposed by the makefile interposer. In another embodiment, interposition may be applied to process that launches subcommands and that reads or writes files in the file system.

In one embodiment, the makefile may use a variable to represent which compiler to call. The makefile interposer 220 may read the value of the variable, analyze the interposer specification 230, and determine if the compiler specified by the variable is appropriate for the second platform. If the compiler specified it not appropriate, the makefile interposer may use the appropriate compiler for the second platform specified in the interposer specification 230 and interpose that compiler on the call. If no compiler is specified for the second platform in the interposer specification 230, the makefile interposer 220 may use a default compiler. In another embodiment, the makefile may explicitly call a compiler for the first platform. The makefile interposer 220 may analyze the compiler specified, analyze the interposer specification 230, and determine if the compiler specified is appropriate for the second platform. If the compiler specified is not appropriate, the makefile interposer may use the appropriate compiler for the second platform specified in the interposer specification 230 and interpose that compiler on the call. If no compiler is specified for the second platform in the interposer specification 230, the makefile interposer 220 may use a default compiler.

In one embodiment, the makefile interposer 220 may not only interpose the call to the compiler for different platforms, the makefile interposer 220 may also interpose to the compiler for the same platform the makefile 220 was written for. For example, the makefile may specify that version 4.0 of the compiler be used when building the program. However, a new version of the compiler 4.1 with needed fixes may be released. Rather then change all the makefiles that call version 4.0 of the compiler, the interposer may simply intercept all of the calls to the older 4.0 version of the compiler and interpose the newer 4.1 version of the compiler onto those calls.

Figure 2B:
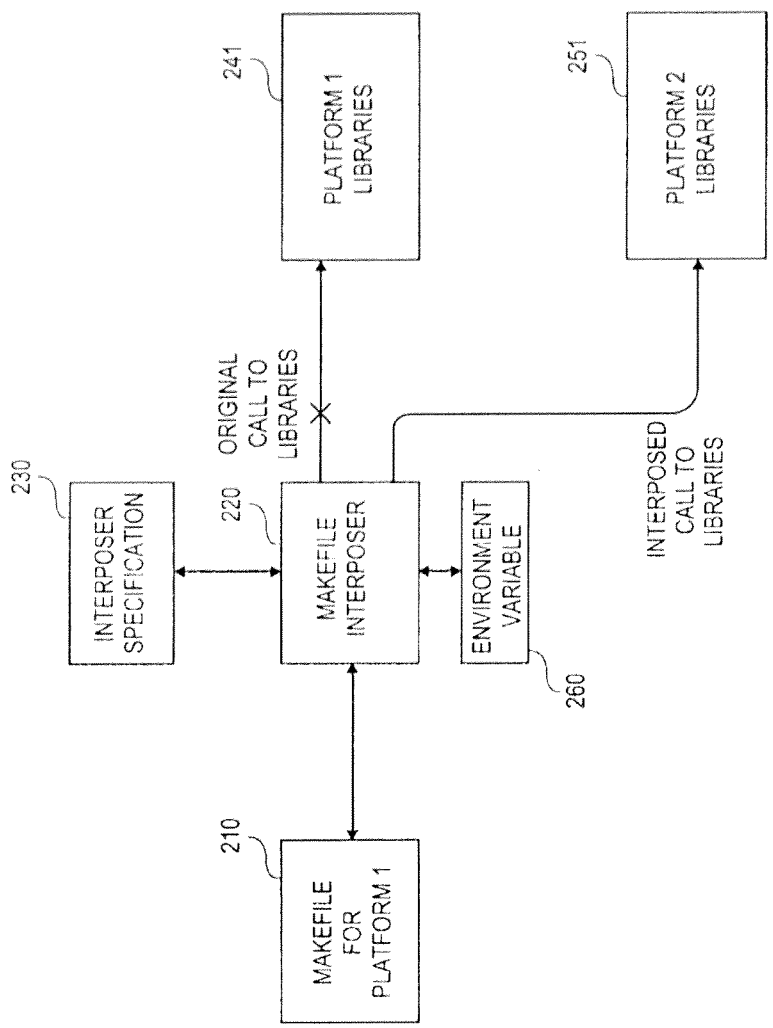
FIG. 2B shows a component diagram of a makefile interposer according to a second embodiment.

FIG. 2B is a component diagram of another embodiment. Makefile 210 may include commands that may be used by the make utility to build a program for a first platform. The makefile interposer 220 may process the makefile 210. It may check an environment variable 260 to determine which platform the program may be built for. In this example, the environment variable 260 may specify that the program is to be built for a second platform. The environment variable 260 may include a name or any information which may be used to identify a platform. Library files 241 are specified for platform one in makefile 210. The makefile interposer 220 may analyze the command which lists the library files 241, and it may interpose (i.e. change or substitute) the library files for the first platform 241 with the library files for the second platform 251. In one embodiment, the make file interposer 220 may run the command specified in the makefile 210. Make may call the libraries for the first platform 241 and the makefile interposer 220 may intercept the call to the libraries for the first platform 241, and redirect that call to the libraries for the second platform 251. In another embodiment, the makefile interposer 220 may analyze the command and then interpose the libraries for the second platform 251 before making the call to the libraries.

In one embodiment, the makefile may use a variable to represent which libraries are used. The makefile interposer 220 may read the value of the variable, analyze the interposer specification 230, and determine if the libraries specified by the variable are appropriate for the second platform. If the libraries specified are not appropriate, the makefile interposer may use the appropriate libraries for the second platform specified in the interposer specification 230 and interpose those libraries. If no libraries are specified for the second platform in the interposer specification 230, the makefile interposer 220 may use a default set of libraries. In another embodiment, the makefile may explicitly list the libraries for the first platform. The makefile interposer 220 may analyze the libraries specified, analyze the interposer specification 230, and determine if the specified libraries are appropriate for the second platform. If the libraries specified are not appropriate, the makefile interposer may use the appropriate libraries for the second platform specified in the interposer specification 230 and interpose those libraries. If no libraries are specified for the second platform in the interposer specification 230, the makefile interposer 220 may use a default set of libraries.

Figure 2C:
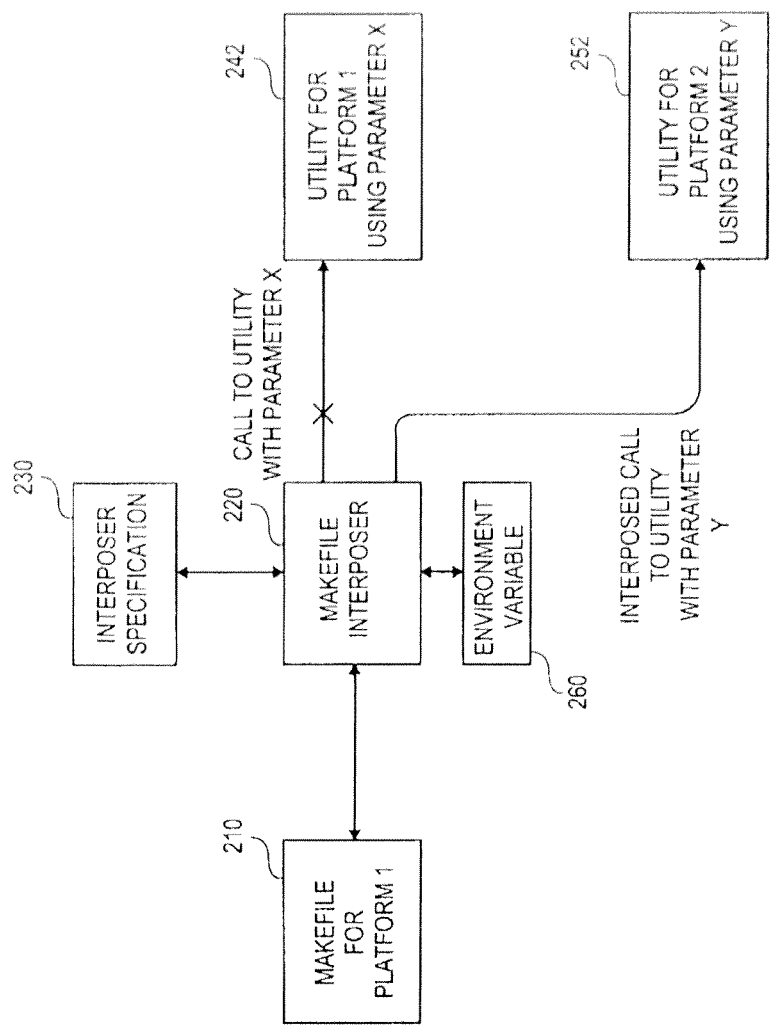
FIG. 2C shows a component diagram of a makefile interposer according to a third embodiment.

FIG. 2C is a component diagram of another embodiment. Makefile 210 may include commands that may be used by the make utility to build a program for a first platform. The makefile interposer 220 may process the makefile 210. It may check an environment variable 260 to determine which platform the program may be built for. In this example, the environment variable 260 may specify that the program is to be built for a second platform. The environment variable 260 may include a name or any information which may be used to identify a platform. A utility program 242 used for building the program is specified for pi a I form one in makefile 210. The makefile interposer 220 may analyze the command which calls the utility program 242, and it may interpose (i.e. change or substitute) the utility program for the first platform 242 with the library files for the second platform 252. In one embodiment, the make file interposer 220 may run the command specified in the makefile 210. Make may call the utility program for the first platform 242 and the makefile interposer 220 may intercept the call to the utility program for the first platform 242, and redirect that call to the utility program for the second platform 252. In another embodiment, the makefile interposer 220 may analyze the command and then interpose the utility program for the second platform 252 before making the call to the libraries.

In one embodiment, the makefile may use a variable to represent the utility program to be called. The makefile interposer 220 may read the value of the variable, analyze the interposer specification 230, and determine if the utility program specified by the variable is appropriate for the second platform. If the utility program specified is not appropriate, the makefile interposer may use the appropriate utility program for the second platform specified in the interposer specification 230 and interpose the utility program into the call. If no utility program is specified for the second platform in the interposer specification 230, the makefile interposer 220 may use a default utility program. In another embodiment, the makefile may explicitly list the utility program for the first platform. The makefile interposer 220 may analyze the utility program specified, analyze the interposer specification 230, and determine if the specified utility program is appropriate for the second platform. If the specified utility program specified is not appropriate, the makefile interposer may use the appropriate utility program for the second platform specified in the interposer specification 230 and interpose those libraries. If no utility program is specified for the second platform in the interposer specification 230, the makefile interposer 220 may use a default set of libraries.

For example, a program may use an OpenGF module in order to display visual images correctly. This OpenGL module may need to be compiled using a different compiler than the compiler used to build the program for a particular platform. A makefile may have a command which compiles the OpenGL module first, and then uses the compiled OpenGL module to build the final program. In one embodiment, a different OpenGL compiler may be used for each platform. The makefile interposer would intercept the call to the OpenGL compiler and interpose the correct compiler for the platform into the call. In another embodiment, the makefile interposer may not only intercept a call to a particular utility program or build tool, but it may also modify the parameters that are passed to the utility program or build tool. For example, not only may a different OpenGL compiler be used for the OpenGL module depending on the platform, but there may be a parameter for each platform specifying whether or not to optimize the compilation of the OpenGL module. The makefile interposer may also interpose the parameters to the utility program in addition to the call to the utility program itself.

In one embodiment, the interposer may be used to enforce usage of specific utilities or parameters regardless of whether or not the makefile is being used for another platform. For example, a build file may be written for a particular platform, but due to licensing issues, the makefile interposer may interpose a compiler for which the developers have a license for, even though the makefile is still being used tor its original intended platform, this example may apply regardless of whether or not the makefile is being used for a different platform. In another example, the makefile interposer may be used to enforce a particular parameter for a call. Developers may want all compiler warnings to be ignored even though the original makefile specified otherwise.

In another embodiment, even the source code itself may be interposed. For example, a makefile may require that a file "class1.c" be compiled. The developers may now want to use "class1-fix1.c" because the newer source code file contains an essential fix. The original makefile may still be used to build the program, and the makefile interposer may simply interpose the newer source code file into the call to the compiler.

In another embodiment, the makefile interposer may dynamically determine the intended target platform for the program without using the environment variable. For example, the makefile may refer to a specific set of libraries which are only used for a specific platform. The makefile interposer may recognize the use of the set of libraries and infer that the program is intended for the specific platform which uses those libraries.

Figure 2D:
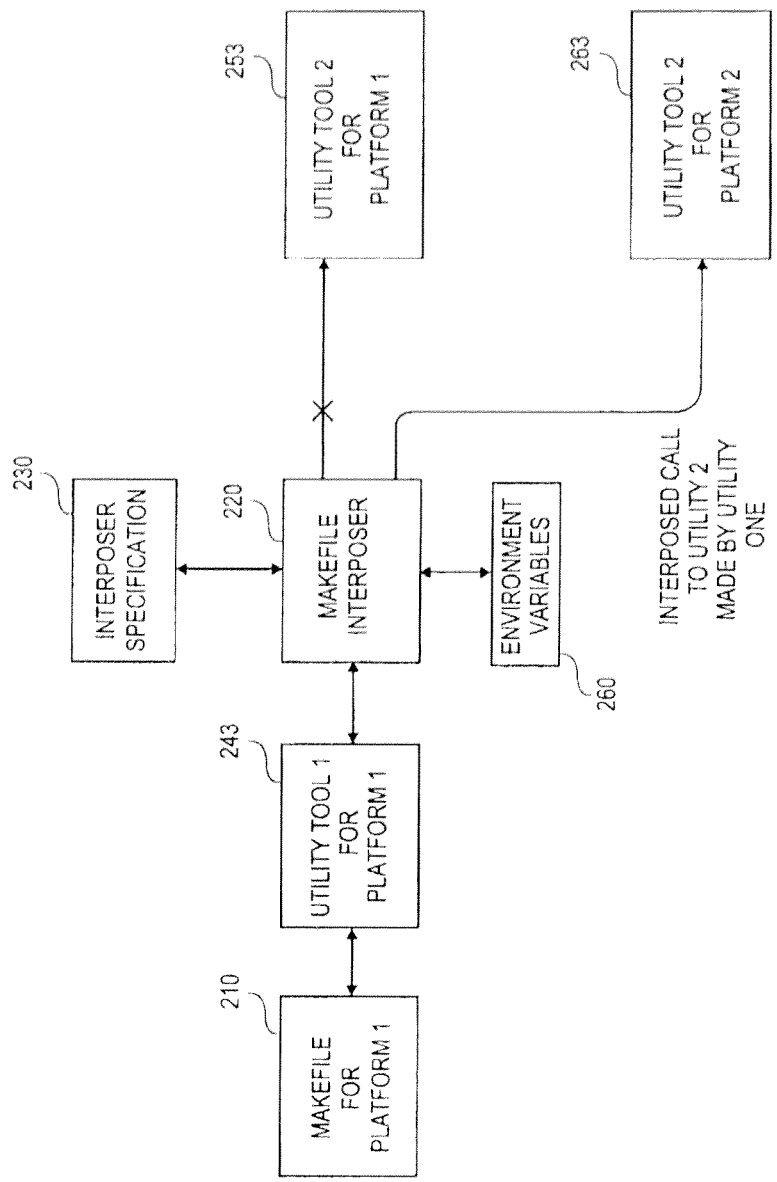
FIG. 2D shows a component diagram of a makefile interposer according to a fourth embodiment.

FIG. 2D illustrates another embodiment. In this embodiment, makefile 210 calls a utility tool 243 for platform 1. Utility tool 1 in turn calls utility tool 2 for the first platform. Makefile interposer 220 may check an environment variable 260 to determine which platform the program may be built for. In this example, the environment variable 260 may specify that the program is to be built for a second platform. Environment variable 260 may include a name or any information which may be used to identify a platform. Makefile interposer 220 may intercept the call made by utility tool 1 to utility tool 2 for the first platform 253, It may interpose the call to utility tool 2 for the first platform 253 and redirect the call to utility tool 2 for the second platform 263.

Figure 2E:
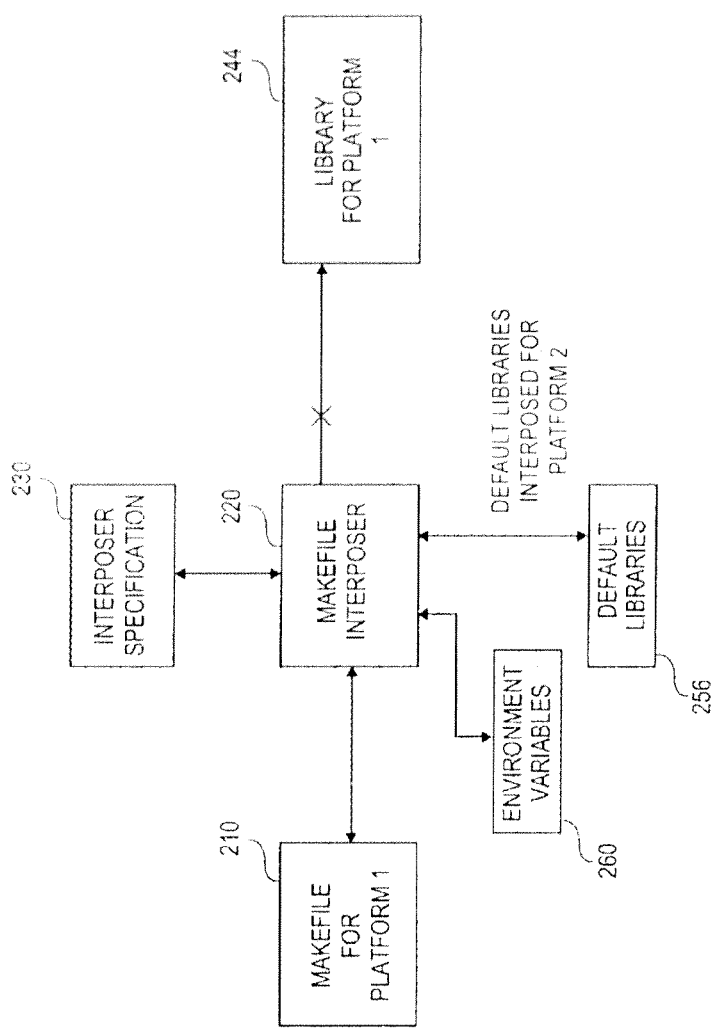
FIG. 2E shows a component diagram of a makefile interposer according to a fifth embodiment.

FIG. 2E illustrates a fifth embodiment. Makefile 210 may include commands that may be used by the make utility to build a program for a first platform. The makefile interposer 220 may process the makefile 210. It may check an environment variable 260 to determine which platform the program may be built for. In this example, the environment variable 260 may specify that the program is to be built for a second platform. The environment variable 260 may include a name or any information which may be used to identify a platform. In this embodiment, there are no library files specified for platform two in interposer specification 230. Makefile interposer 220 will then interpose default libraries 256 when the libraries for the first platform 244 are called. In this embodiment, makefile interpose 220 is able to fall back onto default applications, tools, libraries etc. if it is unable to find the information it needs in interposer specification 230.

Figure 3A:
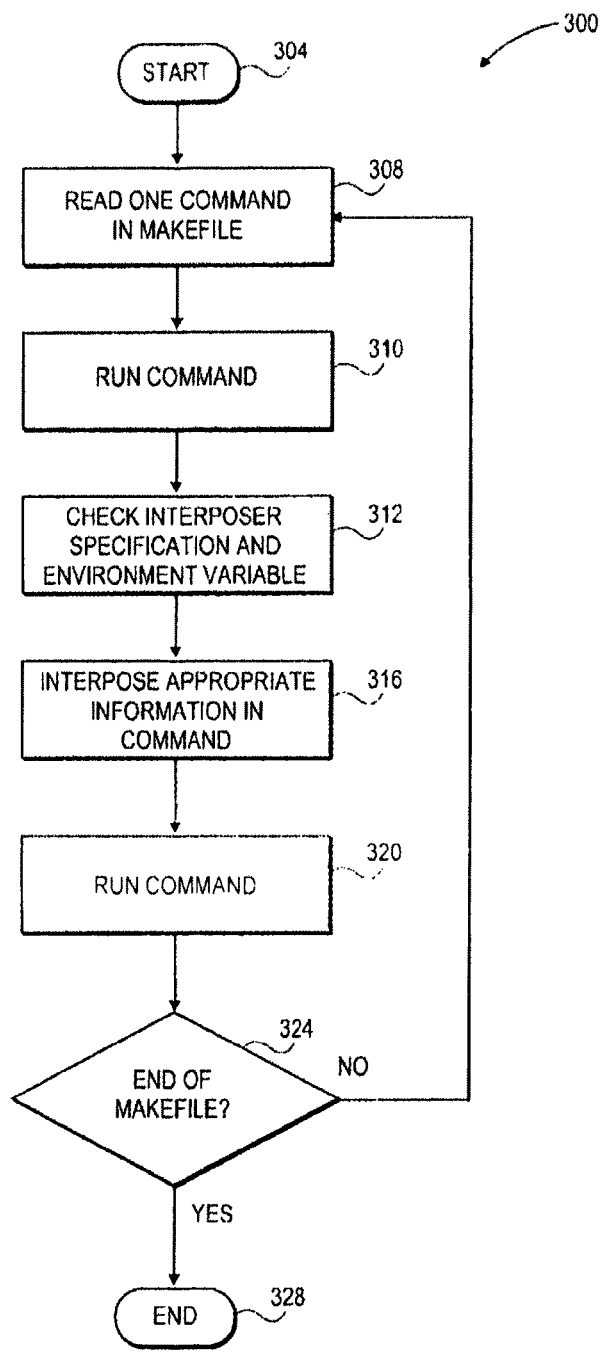
FIG. 3A shows a flow diagram of an interposing process according to a first embodiment.

FIG. 3A is a flow diagram of an interposing process 300 according to a first embodiment. The process starts at step 304 where the make utility may first open and read the makefile. It reads one command at step 308. At step 310, the make utility runs the command. Then at step 312, the makefile interposer may check the interposer specification and an environment variable that indicates which platform the program is intended to run on. The makefile interposer then retrieves the required information from the interposer specification. At step 316, the command is interposed with the appropriate information for the target platform. Once the command has been interposed, the command is executed at step 320. The interposer then cheeks if the end of the makefile has been reached at step 324. If there are still more commands to run, the process then loops back to step 308. If there are no more commands to run, then process ends at step 328.

Figure 3B:
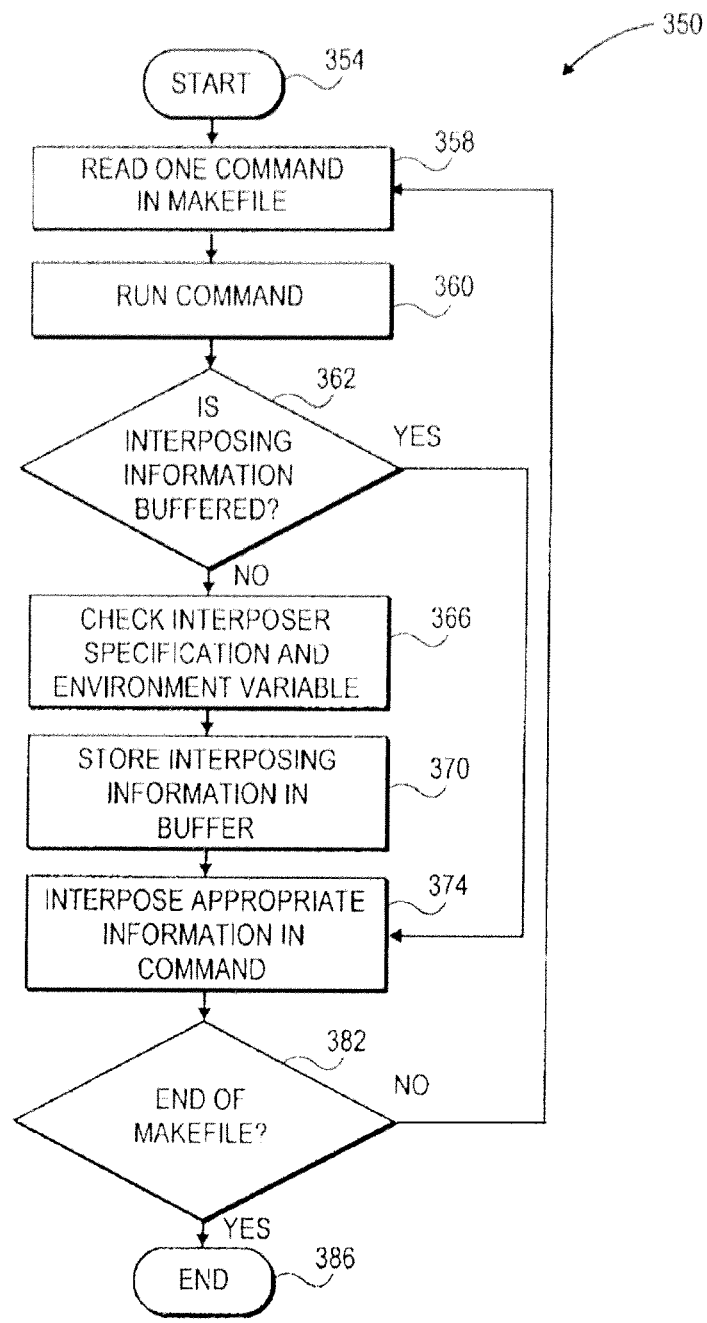
FIG. 3B shows a flow diagram of an interposing process according to a second embodiment.

FIG. 3B is a How diagram of an interposing process 350 according to a second embodiment. The process starts at step 354 where the make utility may first open and read the makefile. The make utility then reads one command at step 358. At step 360, the make utility runs the command. Then at step 362, the makefile interposer may check to see if the information that needs to interposed has been previously accessed and buffered. If the information that needs to be interposed has been buffered, the process may move onto step 374. If the information has not been buffered, the process then proceeds to step 366 where the makefile interposer may check the interposer specification and an environment variable that indicates which platform the program is intended to run on. The makefile interposer then retrieves the required information from the interposer specification. At step 370, the makefile interposer may store the retrieved information in a buffer for possible future use. At step 374, the command is interposed with the appropriate information for the target platform. Once the command has been interposed, the command is executed at step 378. The make utility then checks if the end of the makefile has been reached at step 382. If there are still more commands to run, the process then loops back to step 358. If there are no more commands to run, then process ends at step 386.

Figure 3C:
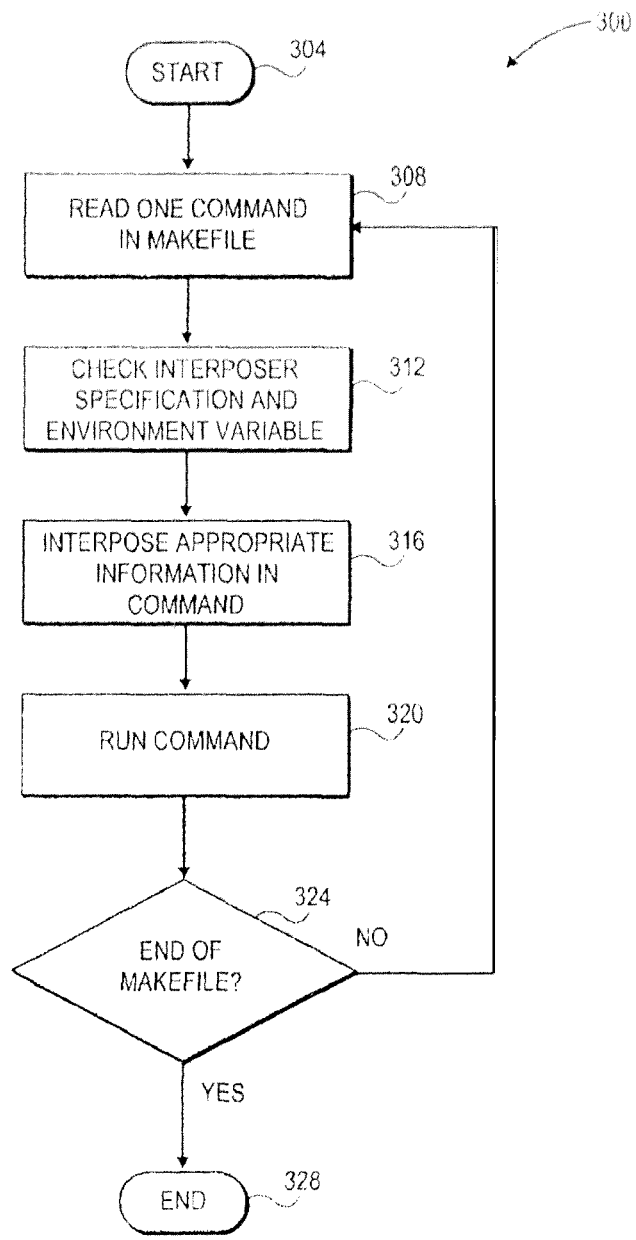
FIG. 3C shows a flow diagram of an interposing process according to a third embodiment.

FIG. 3C is a flow diagram of an interposing process 300 according to a third embodiment. The process starts at step 304 where the makefile interposer may first open and read the makefile. It reads one command at step 308. Then at step 312, the makefile interposer may check the interposer specification and an environment variable that indicates which platform the program is intended to run on. The makefile interposer then retrieves the required information from the interposer specification. At step 316, the command is interposed with the appropriate information for the target platform. Once the command has been interposed, the command is executed at step 320. The interposer then checks if the end of the makefile has been reached at step 324. If there are still more commands to run, the process then loops back to step 308. If there are no more commands to run, then process ends at step 328.

Figure 3D:
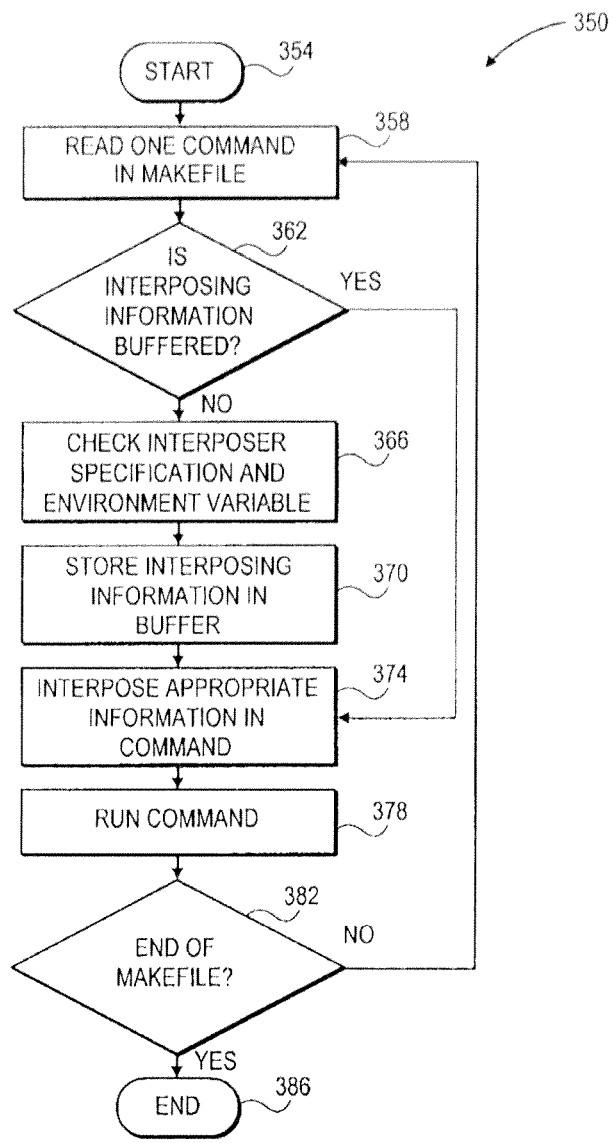
FIG. 3D shows a flow diagram of an interposing process according to a fourth embodiment.

FIG. 3D is a flow diagram of an interposing process 350 according to a fourth embodiment. The process starts at step 354 where the makefile interposer may first open and read the makefile. It reads one command at step 358. Then at step 362, the makefile interposer may check to see if the information that needs to interposed has been previously accessed and buffered. If the information that needs to be interposed has been buffered, the process may move onto step 374. If the information has not been buffered, the process then proceeds to step 366 where the makefile interposer may check the interposer specification and an environment variable that indicates which platform the program is intended to run on. The makefile interposer then retrieves the required information from the interposer specification. At step 370, the makefile interposer may store the retrieved information in a buffer for possible future use. At step 374, the command is interposed with the appropriate information for the target platform. Once the command has been interposed, the command is executed at step 378. The interposer then checks if the end of the makefile has been reached at step 382. If there are still more commands to run, the process then loops back to step 358. If there are no more commands to run, then process ends at step 386. In one embodiment, the makefile interposer may read each command in the makefile and interpose as it reads each command. In another embodiment, the make file interposer may read all of the commands in the makefile and then interpose all of the commands after they have all been Because hardware, software and operating systems are constantly being changed and update, new platforms are constantly created and older platforms are constantly modified. As a result the makefile interposer may also include an interposer specification. The interposer specification may contain information or macros which the makefile interposer may use when interposing commands in the makefile. The interposer specification may be updated as new platforms are added and older platforms are modified, thereby allowing the same makefile to be used for new platforms and older platforms that have been updated.

In one embodiment, the makefile interposer may be integrated with an IDE. The makefile interposer may be used to provide information regarding dependencies to the IDE which may be displayed to the developer. For example, a particular set of modules may need to be precompiled before the program may be built because the program uses those modules. The makefile would normally take care of building the modules first and then building the program after. This information may not be readily apparent within an IDE as generally only source code and class or object hierarchies are displayed. The makefile interposer would identify these dependencies to the IDE and the IDE may displays these dependencies to the developer in a separate user interface.

Figure 4:
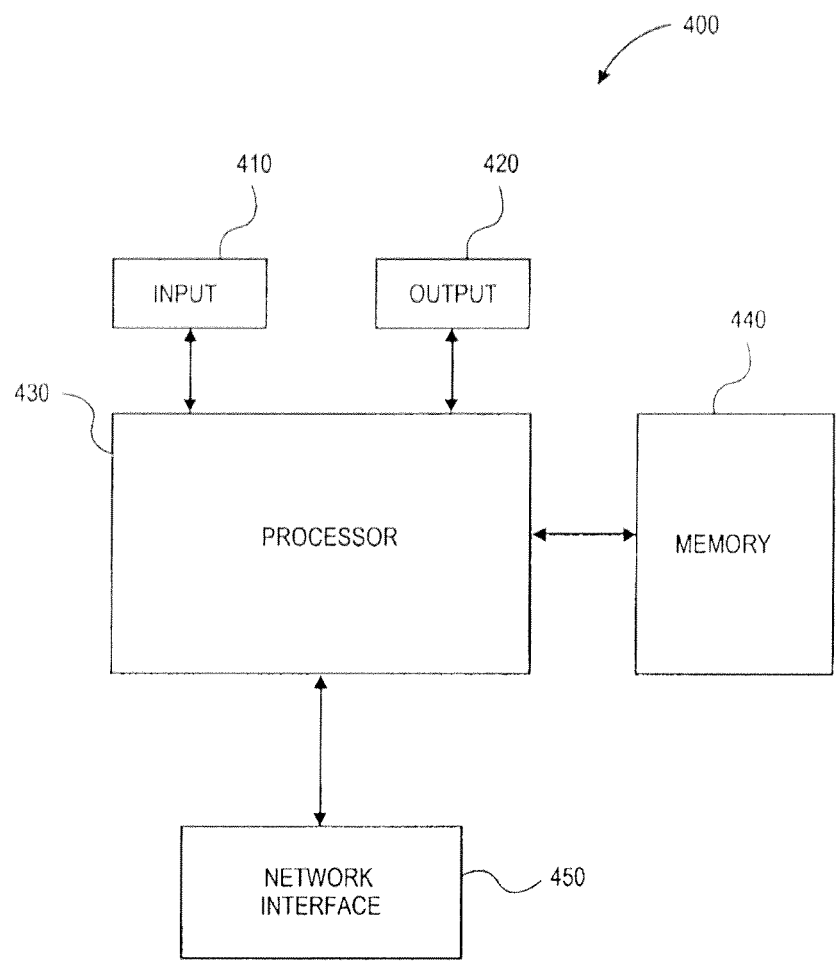
FIG. 4 shows a block diagram of a computing system.

FIG. 4 is a block diagram illustrating an example of one of the computing systems 110 which may use embodiments as illustrated in FIGS. 1A-3D. The computing system 400 includes a processor 430 that is in communication with a memory 440 and a network interface 450. The network interface 450 may receive signals according to wired technologies including but not limited to Ethernet, telephone (e.g., POTS), and fiber optic systems, and/or wireless technologies including but not limited a code division multiple access (CDMA or CDMA2000) communication system, a GSM/GPRS (General Packet Radio Service)/EDGE (enhanced data GSM environment) or an IEEE 802.11b system. The system 400 may also include one or more of an output device 420 such as a visual display and a user input device 410 such as a keypad, touch screen, or other suitable tactile input device.

Referring to FIG. 4, the computing system 400 is represented as a series of interrelated functional blocks that may represent functions implemented by, for example the processor 430, software, some combination thereof, or in some other manner as taught herein. For example, the processor 430 may facilitate user input via the input device 410.

Figure 5A:
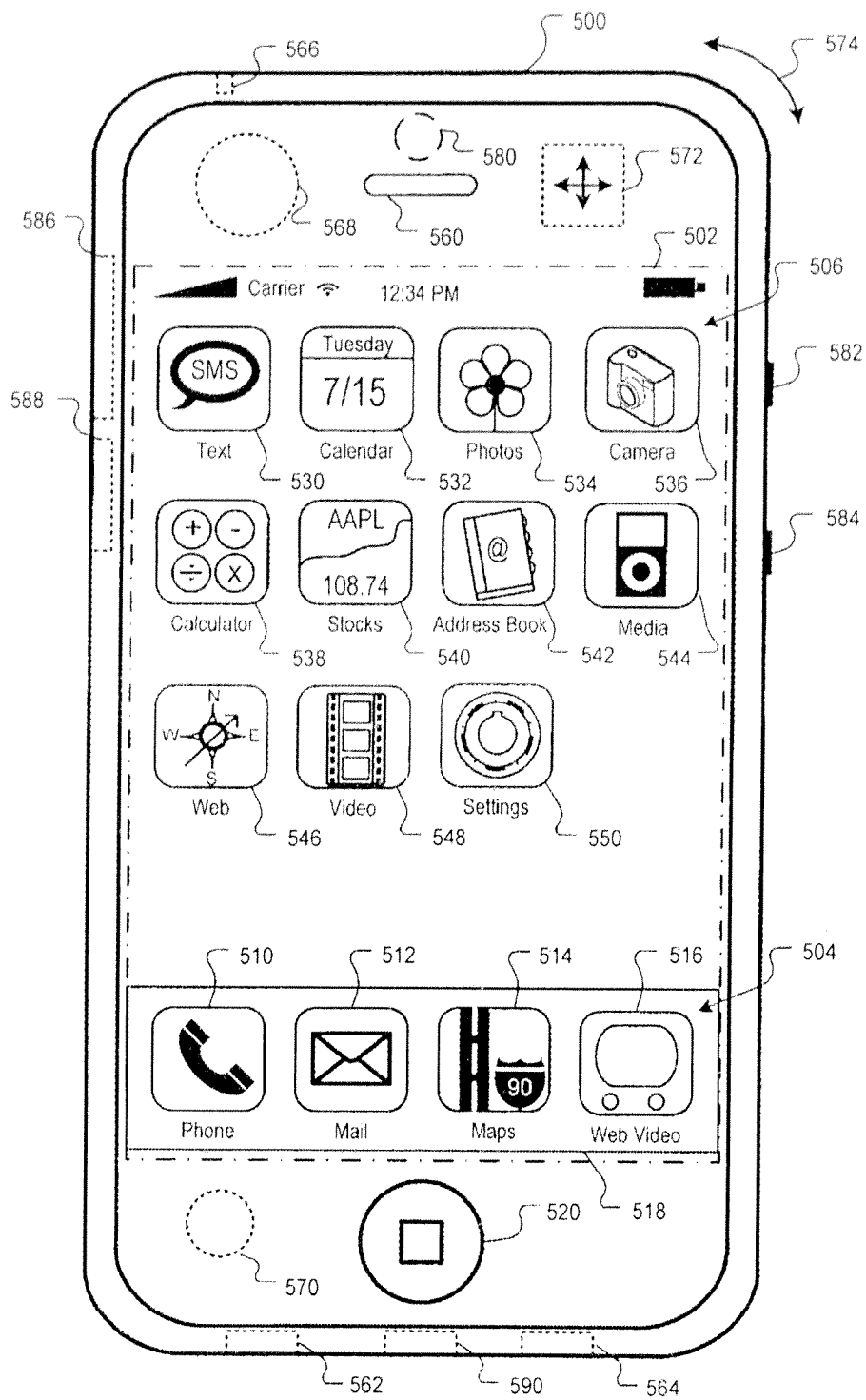
FIG. 5A illustrates an example embodiment of a mobile device.

FIG. 5A illustrates an example mobile device 500. The mobile device 500 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

In some implementations, the mobile device 500 includes a touch-sensitive display 502. The touch-sensitive display 502 can be implemented with liquid crystal display (LCD) technology, light emitting polymer display (LPD) technology, or some other display technology. The touch-sensitive display 502 can be sensitive to haptic and/or tactile contact with a user.

In some implementations, the touch-sensitive display 502 may include a multi-touch-sensitive display 502. A multi-touch-sensitive display 502 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 500 can display one or more graphical user interfaces on the touch-sensitive display 502 for providing the user access to various system objects and for conveying information to the user. In some implementations, the graphical user interface can include one or more display objects 504, 506. In the example shown, the display objects 504, 506, are graphic representations of system objects. Some examples of system objects include device functions, applications, windows, files, alerts, events, or other identifiable system objects.

In some implementations, the mobile device 500 can implement multiple device functionalities, such as a telephony device, as indicated by a Phone object 510; an e-mail device, as indicated by the Mail object 512; a map devices, as indicated by the Maps object 514; a Wi-Fi base station device (not shown); and a network video transmission and display device, as indicated by the Web Video object 516. In some implementations, particular display objects 504, e.g., the Phone object 510, the Mail object 512, the Maps object 514, and the Web Video object 516, can be displayed in a menu bar 518. In some implementations, device functionalities can be accessed from a top-level graphical user interface, such as the graphical user interface illustrated in FIG. 5A. Touching one of the objects 510, 512, 514. or 516 can, for example, invoke a corresponding functionality.

In some implementations, the mobile device 500 can implement a network distribution functionality. For example, the functionality can enable the user to take the mobile device 500 and provide access to its associated network while traveling. In particular, the mobile device 500 can extend Internet access (e.g., Wi-Fi) to other wireless devices in the vicinity. For example, mobile device 500 can be configured as a base station for one or more devices. As such, mobile device 500 can grant or deny network access to other wireless devices.

In some implementations, upon invocation of a device functionality, the graphical user interface of the mobile device 500 changes, or is augmented or replaced with another user interface or user interface elements, to facilitate user access to particular functions associated with the corresponding device functionality. For example, in response to a user touching the Phone object 510, the graphical user interface of the touch-sensitive display 502 may present display objects related to various phone functions; likewise, touching of the Mail object 512 may cause the graphical user interface to present display objects related to various e-mail functions; touching the Maps object 514 may cause the graphical user interface to present display objects related to various maps functions; and touching the Web Video object 516 may cause the graphical user interface to present display objects related to various web video functions.

In some implementations, the top-level graphical user interface environment or state of FIG. 5 A can be restored by pressing a button 520 located near the bottom of the mobile device 500. In some implementations, each corresponding device functionality may have corresponding "home" display objects displayed on the touch-sensitive display 502, and the graphical user interface environment of FIG. 5A can be restored by pressing the "home" display object.

In some implementations, the top-level graphical user interface can include additional display objects 506, such as a short messaging service (SMS) object 530, a Calendar object 532, a Photos object 534, a Camera object 536, a Calculator object 538, a Stocks object 540, a Address Book object 542, a Media object 544, a Web object 546, a Video object 548, a Settings object 550, and a Notes object (not shown). Touching the SMS display object 530 can, for example, invoke an SMS messaging environment and supporting functionality; likewise, each selection of a display object 532, 534, 536, 538, 540, 542, 544, 546, 548, and 550 can invoke a corresponding object environment and functionality.

Additional and/or different display objects can also be displayed in the graphical user interface of FIG. 5A. For example, if the device 500 is functioning as a base station for other devices, one or more "connection" objects may appear in the graphical user interface to indicate the connection. In some implementations, the display objects 506 can be configured by a user, e.g., a user may specify which display objects 506 are displayed, and/or may download additional applications or other software that provides other functionalities and corresponding display objects.

In some implementations, the mobile device 500 can include one or more input/output (I/O) devices and/or sensor devices. For example, a speaker 560 and a microphone 562 can be included to facilitate voice-enabled functionalities, such as phone and voice mail functions. In some implementations, an up/down button 584 for volume control of the speaker 560 and the microphone 562 can be included. The mobile device 500 can also include an on/off button 582 for a ring indicator of incoming phone calls. In some implementations, a loud speaker 564 can be included to facilitate hands-free voice functionalities, such as speaker phone functions. An audio jack 566 can also be included for use of headphones and/or a microphone.

In some implementations, a proximity sensor 568 can be included to facilitate the detection of the user positioning the mobile device 500 proximate to the user's ear and, in response, to disengage the touch-sensitive display 502 to prevent accidental function invocations. In some implementations, the touch-sensitive display 502 can be turned off to conserve additional power when the mobile device 500 is proximate to the user's ear.

Other sensors can also be used. For example, in some implementations, an ambient light sensor 570 can be utilized to facilitate adjusting the brightness of the touch-sensitive display 502. In some implementations, an accelerometer 572 can be utilized to detect movement of the mobile device 500, as indicated by the directional arrow 574. Accordingly, display objects and/or media can be presented according to a detected orientation, e.g., portrait or landscape. In some implementations, the mobile device 500 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 500 or provided as a separate device that can be coupled to the mobile device 500 through an interface (e.g., port device 590) to provide access to location-based services.

In some implementations, a port device 590, e.g., a Universal Serial Bus (USB) port, or a docking port, or some other wired port connection, can be included. The port device 590 can, for example, be utilized to establish a wired connection to other computing devices, such as other communication devices 500, network access devices, a personal computer, a printer, a display screen, or other processing devices capable of receiving and/or transmitting data. In some implementations, the port device 590 allows the mobile device 500 to synchronize with a host device using one or more protocols, such as, for example, the TCP/IP, HTTP, UDP and any other known protocol.

The mobile device 500 can also include a camera lens and sensor 580. In some implementations, the camera lens and sensor 580 can be located on the back surface of the mobile device 500. The camera can capture still images and/or video.

The mobile device 500 can also include one or more wireless communication subsystems, such as an 802.11b/g communication device 586, and/or a Bluetooth™ communication device 588. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Figure 5B:
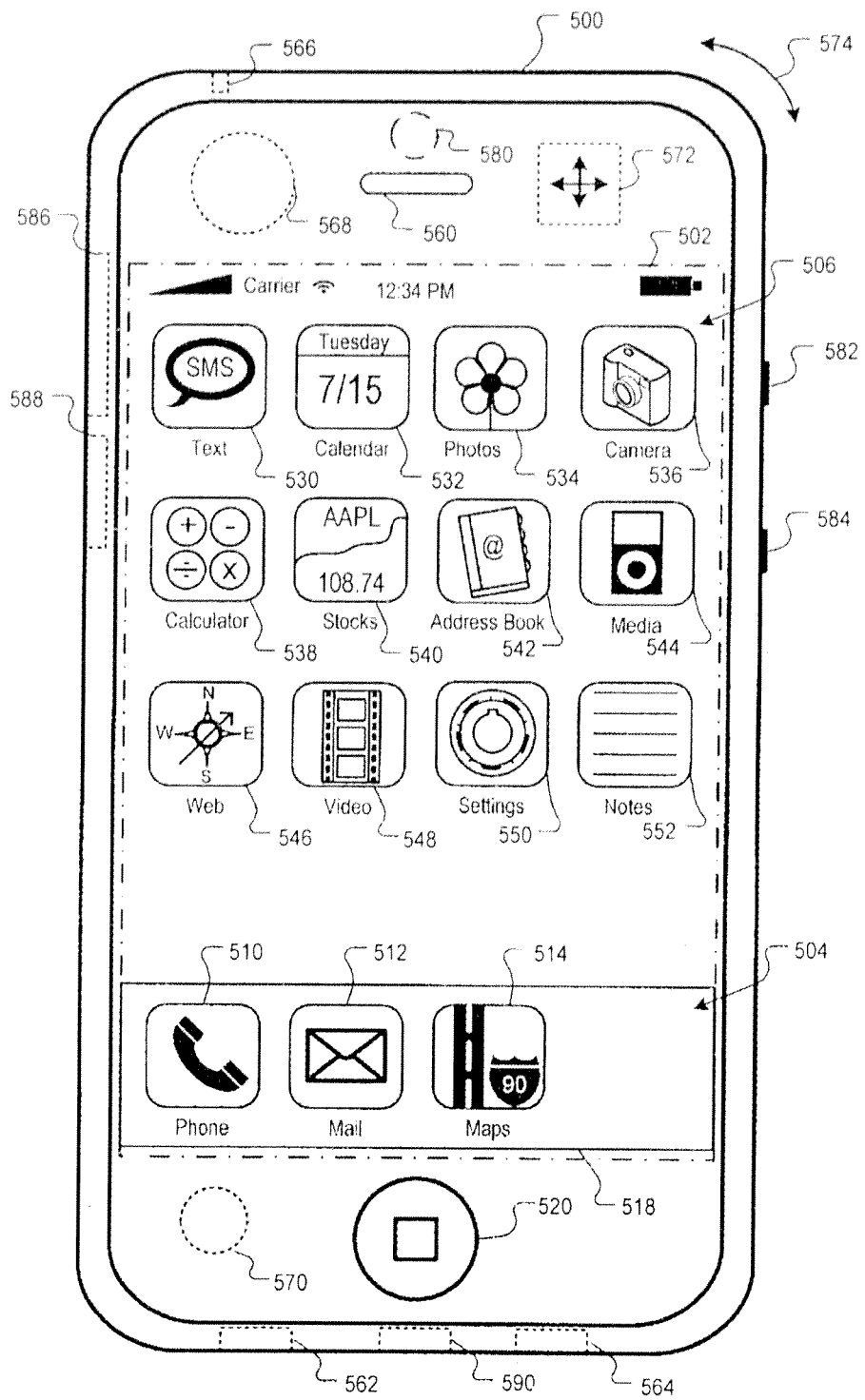
FIG. 5B illustrates an example embodiment of a configurable top-level graphical user interface of a mobile device.

FIG. 5B illustrates another example of configurable top-level graphical user interface of device 500. The device 500 can be configured to display a different set of display objects.

In some implementations, each of one or more system objects of device 500 has a set of system object attributes associated with it; and one of the attributes determines whether a display object for the system object will be rendered in the top-level graphical user interface. This attribute can be set by the system automatically, or by a user through certain programs or system functionalities as described below. FIG. 5B shows an example of how the Notes object 552 (not shown in FIG. 5A) is added to and the Web Video object 516 is removed from the top graphical user interface of device 500 (e.g. such as when the attributes of the Notes system object and the Web Video system object are modified).

Figure 6:
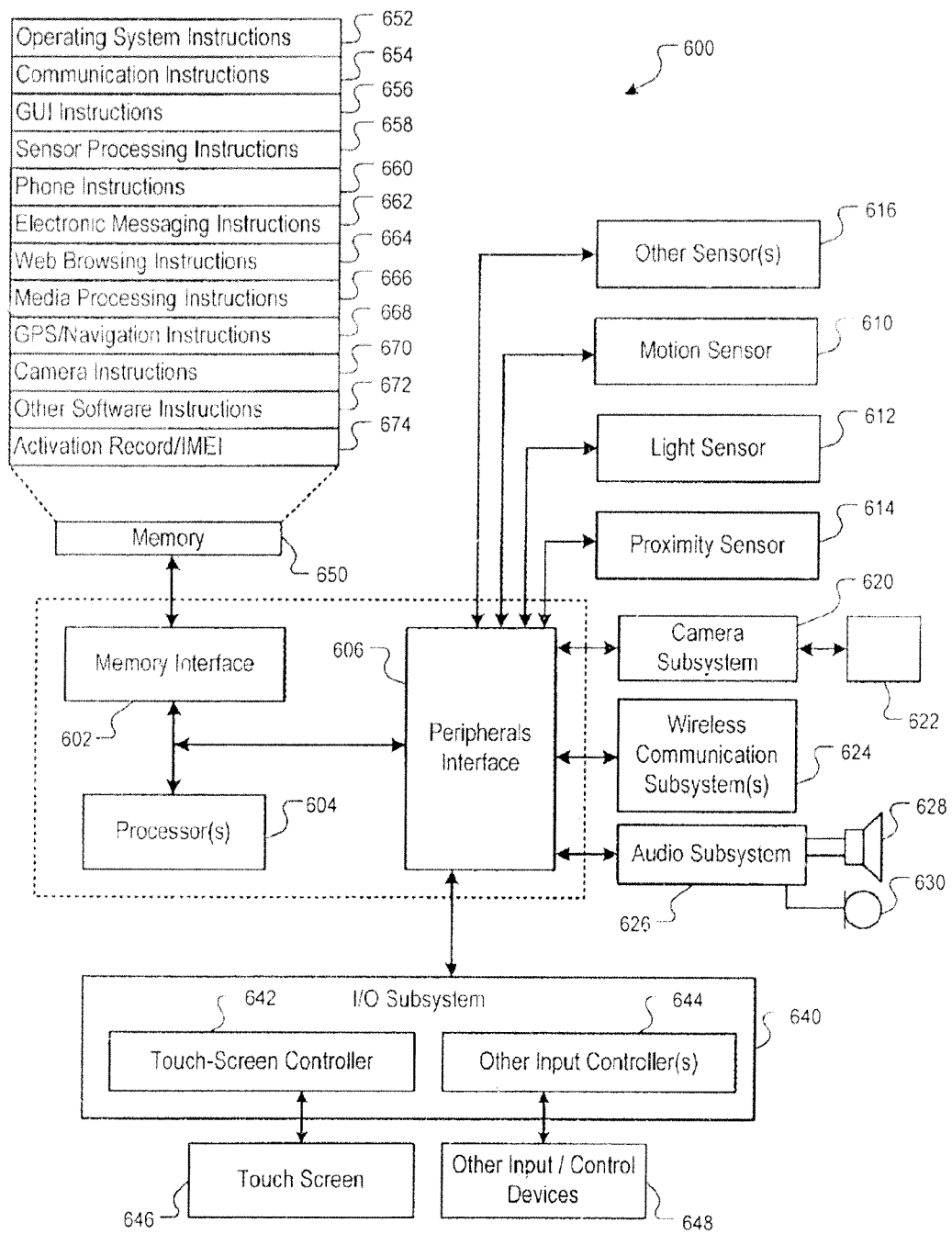
FIG. 6 is a block diagram of an example implementation of a mobile device.

FIG. 6 is a block diagram 600 of an example implementation of a mobile device (e.g., mobile device 500). The mobile device can include a memory interface 602, one or more data processors, image processors and/or central processing units 604, and a peripherals interface 606. The memory interlace 602, the one or more processors 604 and/or the peripherals interface 606 can be separate components or can be integrated in one or more integrated circuits. The various components in the mobile device can be coupled by one or more communication buses or signal lines.

Sensors, devices, and subsystems can be coupled to the peripherals interface 606 to facilitate multiple functionalities. For example, a motion sensor 610, a light sensor 612, and a proximity sensor 614 can be coupled to the peripherals interface 606 to facilitate the orientation, lighting, and proximity functions described with respect to FIG. 5A. Other sensors 616 can also be connected to the peripherals interlace 606, such as a positioning system (e.g., GPS receiver), a temperature sensor, a biometric sensor, or other sensing device, to facilitate related functionalities.

A camera subsystem 620 and an optical sensor 622, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which the mobile device is intended to operate. For example, a mobile device can include communication subsystems 624 designed to operate over a GSM network, a GPRS network, an EDGE network, a Wi-Fi or WiMax network, and a Bluetooth™ network, fn particular, the wireless communication subsystems 624 may include hosting protocols such that the mobile device may be configured as a base station for other wireless devices.

An audio subsystem 626 can be coupled to a speaker 628 and a microphone 66 to facilitate voice-enabled functions, such as voice recognition, voice replication, digital recording, and telephony functions.

The I/O subsystem 640 can include a touch screen controller 642 and/or other input controller(s) 644. The touch-screen controller 642 can be coupled to a touch screen 646. The touch screen 646 and touch screen controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 646.

The other input controller(s) 644 can be coupled to other input/control devices 648, such as one or more buttons, rocker switches, thumb-wheel, infrared port, USB port. and/or a pointer device such as a stylus. The one or more buttons (not shown) can include an up/down button for volume control of the speaker 628 and/or the microphone 66.

In one implementation, a pressing of the button for a first duration may disengage a lock of the touch screen 646; and a pressing of the button for a second duration that is longer than the first duration may turn power to the mobile device on or off. The user may be able to customize a functionality of one or more of the buttons. The touch screen 646 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player, such as an iPod™. The mobile device may, therefore, include a 32-pin connector that is compatible with the iPod™. Other input/output and control devices can also be used.

The memory interface 602 can be coupled to memory 650. The memory 650 can include high-speed random access memory and/or non-volatile memory, such as one or more magnetic disk storage devices, one or more optical storage devices, and/or flash memory (e.g., NAND, NOR). The memory 650 can store an operating system 652, such as Darwin, RTXC, LINUX, UNIX, OS X, WINDOWS, or an embedded operating system such as VxWorks. The operating system 652 may include instructions for handling basic system services and for performing hardware dependent tasks. In some implementations, the operating system 652 can be a kernel (e.g., UNIX kernel).

The memory 650 may also store communication instructions 654 to facilitate communicating with one or more additional devices, one or more computers and/or one or more servers. The memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes and instructions; camera instructions 670 to facilitate camera-related processes and functions; and/or other software instructions 672 to facilitate other processes and functions, e.g., access control management functions. The memory 650 may also store other software instructions (not shown), such as web video instructions to facilitate web video-related processes and functions; and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively. An activation record and International Mobile Equipment Identity (IMEI) 674 or similar hardware identifier can also be stored in memory 650.

The above detailed description of certain embodiments presents various descriptions of specific embodiments. However, the invention can be embodied in a multitude of different ways as defined and covered by the claims. In this description, reference is made to the drawings wherein like parts are designated with like numerals throughout.

The terminology used in the description presented herein is not intended to be interpreted in any limited or restrictive manner, simply because it is being utilized in conjunction with a detailed description of certain specific embodiments. Furthermore, embodiments may include several novel features, no single one of which is solely responsible for its desirable attributes or which is essential to practicing the inventions herein described.

The system may include various modules, tools, and applications as discussed in detail below. As can be appreciated by one of ordinary skill in the art, each of the modules may include various sub-routines, procedures, definitional statements and macros. Each of the modules are typically separately compiled and linked into a single executable program. Therefore, the following description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system modules, tools, and applications may be written in any programming language such as, for example, C, C++, BASIC, Visual Basic, Pascal, Ada, Java, HTML, XML, or FORTRAN, and executed on an operating system, such as variants of Windows, Macintosh, UNIX, Linux, VxWorks, or other operating system. C, C++, BASIC, Visual Basic, Pascal, Ada, Java, HTML, XML and FORTRAN are industry standard programming languages for which many commercial compilers can be used to create executable code.

The above-described method may be realized in a program format to be stored on a computer readable recording medium that includes any kinds of recording devices for storing computer readable data, for example, a CD-ROM, a DVD, a magnetic tape, memory card, and a disk, and may also be realized in a carrier wave formal (e.g., Internet transmission or Bluetooth transmission).

While specific blocks, sections, devices, functions and modules may have been set forth above, a skilled technologist may realize that there are many ways to partition the system, and that there are many parts, components, modules or functions that may be substituted for those listed above.

While the above detailed description has shown, described, and pointed out the fundamental novel features as applied to various embodiments, it may be understood that various omissions and substitutions and changes in the form and details of the system illustrated may be made by those skilled in the art, without departing from the intent of the invention.

What is claimed is;

1. Within an integrated development environment, a computer-implemented method comprising:
    during building a program directly from a build file within the integrated development environment, the program operable to run on a target platform, wherein building the program is based on commands contained in a build file, the build file supporting multiple platforms:
    intercepting a command contained in the build file;
    determining whether the intercepted command uses a resource for building the program;
    determining whether the resource for building the program has a corresponding platform-specific resource that is available for the target platform;
    redirecting the command to use the available corresponding platform-specific resource for the target platform;
    redirecting the command to use a default resource when there is no corresponding platform-specific resource or when the corresponding platform-specific resource is not available; and
    completing building the program directly from the build file and operable to run on the target platform using the available corresponding platform-specific resource or the default resource as directed.

2. The method of claim 1 wherein during building the program directly from the build file within the integrated development environment, the method further comprises:
    detecting a make utility accessing a descriptor associated with the program, the descriptor referencing the resource, the method further comprising:
    intercepting the accessing of the descriptor;
    determining whether the resource referenced by the descriptor corresponds to a platform-specific resource that is available for the target platform for building the program operable to run on the target platform;
    redirecting the make utility to access the available corresponding platform-specific resource instead of the resource referenced by the descriptor; and
    if not available or no corresponding platform specific resource exists, directing the make utility to access the default resource for building the program operable to run on the target platform.

3. The method of claim 1 wherein the resource for building the program comprises any one or more of a system library, a build tool, a source code object, a parameter, a utility, a file, a compiler, an assembler, a linker, and an interpreter, the method further comprising:
    determining whether the resource uses a second resource for building the program;
    determining whether the second resource for building the program has a corresponding platform-specific second resource that is available for the target platform;
    redirecting the resource to use the available corresponding platform-specific second resource for building the program operable to run on the target platform;
    redirecting the resource to use a default second resource for building the program operable to run on the target platform when there is no corresponding platform-specific second resource or when the corresponding platform-specific second resource is not available.

4. The method of claim 2 wherein directing the make utility to access the available corresponding platform-specific resource for the target platform comprises modifying the descriptor, wherein modifying the descriptor comprises modifying a path used to access the available corresponding platform-specific resource for building the program directly from the build file and operable to run on the target platform.

5. A system for building a program within an integrated development environment, the system comprising:
    processor means for generating a build file for building a program directly from the build file within the integrated development environment, the program operable to run on a plurality of platforms without modifying the build file;
    processor means for building the program directly from the build file to run on a targeted one of the plurality of platforms, the processor means for building comprises:
    means for intercepting commands contained in the build file;
    means for determining whether the intercepted commands use resources for building the program that are modified for the targeted platform;
    means for determining whether the resources for building the program that are modified for the targeted platform are available;

means for causing the intercepted commands to be redirected to use resources for building the program that are modified for the targeted platform when available;

means for causing the intercepted commands to be redirected to use default resources when there are no resources for building the program that are modified for the targeted platform or when the resources for building the program that are modified for the targeted platform are not available; and means for completing building the program directly from the build file and operable to run on the target platform using the available resources for building the program that are modified for the targeted platform or the default resources.

6. An article of manufacture comprising a non-transitory computer-readable medium having stored thereon instructions that, when executed, cause one or more processors to provide functionality within an integrated development environment to:

during building a program directly from a build file within the integrated development environment, the program operable to run on a target platform, wherein building the program directly from the build file is based on commands contained in the build file, the build file supporting multiple platforms:

intercept a command contained in the build file;

determine whether the intercepted command uses a resource for building the program;

determine whether the resource for building the program has a corresponding platform-specific resource that is available for the target platform;

redirect the command to use the available corresponding platform-specific resource for the target platform;

redirect the command to use a default resource when there is no corresponding platform-specific resource or when the corresponding platform-specific resource is not available; and complete building the program directly from the build file for the target platform using the available corresponding platform-specific resource or the default resource as redirected.

7. The article of claim 6 wherein the instructions cause the one or more processors to, during building the program: detect a make utility accessing a descriptor associated with the program, the descriptor referencing the resource, the method further comprising:

intercept the accessing of the descriptor;

determine whether the resource referenced by the descriptor corresponds to a platform-specific resource that is available for the target platform for building the program operable to run on the target platform;

redirect the make utility to access the available corresponding platform-specific resource instead of the resource referenced by the descriptor; and if not available or no corresponding platform specific resource exists, redirect the make utility to access the default resource for building the program operable to run on the target platform.

8. The article of claim 6 wherein the resource for building the program comprises any one or more of a system library, a build tool, a source code object, a file, a compiler, an assembler, a linker, and an interpreter, the method further comprising:

determining whether the resource uses a second resource for building the program;

determining whether the second resource for building the program has a corresponding platform-specific second resource that is available for the target platform;

redirecting the resource to use the available corresponding platform-specific second resource for building the program operable to run on the target platform;

redirecting the resource to use a default second resource for building the program operable to run on the target platform when there is no corresponding platform-specific second resource or when the corresponding platform-specific second resource is not available.

9. The article of claim 7 wherein the instructions cause the one or more processors to redirect the make utility to access the available corresponding platform-specific resource for the target platform comprises modifying the descriptor, wherein modifying the descriptor comprises modifying a path used to access the available corresponding platform-specific resource for building the program directly from the build file and operable to run on the target platform.

* * * * *